United States Patent [19]

Leon

[11] Patent Number: 4,879,901

[45] Date of Patent: Nov. 14, 1989

[54] SYSTEM FOR EVALUATING THE CONDITION AND PERFORMANCE OF A VALVE AND VALVE OPERATOR COMBINATION

[75] Inventor: Robert L. Leon, Roslyn, Pa.

[73] Assignee: Liberty Technology Center, Inc., Conshohocken, Pa.

[21] Appl. No.: 185,210

[22] Filed: Apr. 22, 1988

Related U.S. Application Data

[63] Continuation-in-part of Ser. No. 87,541, Aug. 20, 1987, Pat. No. 4,805,451.

[51] Int. Cl.[4] .................... F16K 31/05; G01L 05/00; G01P 13/00
[52] U.S. Cl. .................................. 73/168; 73/862.31; 364/508
[58] Field of Search .................. 73/168, 862.31, 767; 364/508

[56] References Cited

U.S. PATENT DOCUMENTS

| | | |
|---|---|---|
| 3,184,962 | 5/1965 | Gay . |
| 3,199,057 | 8/1965 | Gindes et al. . |
| 3,228,240 | 1/1966 | Ormond .......................... 73/767 X |
| 3,354,716 | 11/1967 | Wiebe et al. ...................... 73/168 X |
| 4,118,933 | 10/1978 | Coleman et al. ................. 73/767 X |
| 4,265,110 | 5/1981 | Moulin . |
| 4,542,649 | 9/1985 | Charbonneau et al. . |
| 4,570,903 | 2/1986 | Crass ................................. 73/168 X |
| 4,693,113 | 9/1987 | McNennamy et al. .............. 73/168 |
| 4,735,101 | 4/1988 | Charbonneau et al. ............. 73/168 |

OTHER PUBLICATIONS

MOVATS Incorporated Technical Manual for "Motor Operated Valve Analysis and Test System" (1985).
EPRI (Electric Power Research Institute) Manual, "Improvements in Motor-Operated Valves," EPRI NP-4254, Project 2232-2, Interim Report, Nov. 1985.

Primary Examiner—Daniel M. Yasich
Attorney, Agent, or Firm—Panitch Schwarze Jacobs & Nadel

[57] ABSTRACT

A device for measuring and indicating the forces on a valve stem over at least a portion of the valve strokes is comprised of a strain sensor secured to the valve yoke for sensing strains experienced by the valve yoke. The sensed strains are proportional to the forces on the valve yoke and are equal but opposite to the forces on the valve stem. The strain sensor generates electrical signals proportional to the forces on the valve stem. In one embodiment, a second strain sensor is secured to the valve operator for sensing strains experiences by the valve operator and for generating proportional electrical signals. A display, electrically connected to the strain sensors, is provided for receiving the generated electrical signals and for indicating the forces on the valve stem and the forces on the valve operator. A system for evaluating the performance of a valve and valve operator also utilizes the yoke strain sensor in combination with the operator strain sensor and with other sensors, including a valve stem motion sensor, a spring pack motion sensor, a motor current sensor and, possibly, a stem strain sensor, as well as an indicator of the condition of torque and limit switches. In another embodiment, a vibration sensor is secured to the valve operator for sensing vibrations occurring within the valve and/or the valve operator and for generating proportional electrical signals which are displayed in conjunction with other signals for evaluation of valve and valve operator performance.

15 Claims, 11 Drawing Sheets

FIG. 7a
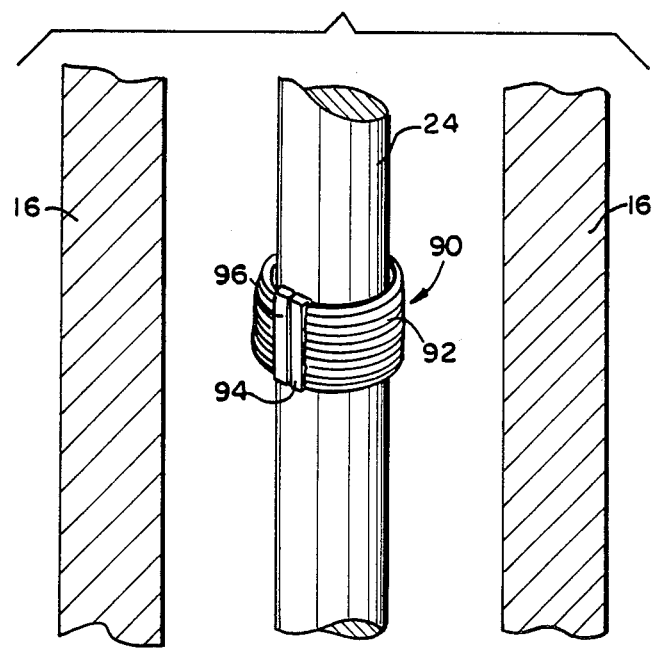
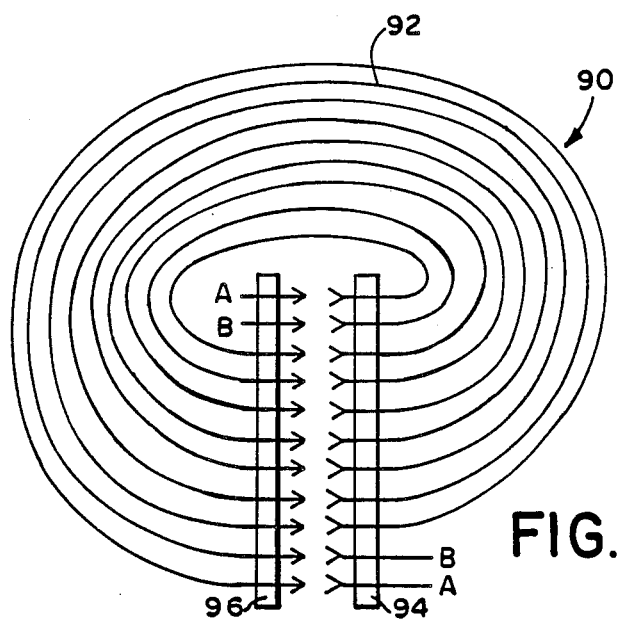
FIG. 7b

SYSTEM FOR EVALUATING THE CONDITION AND PERFORMANCE OF A VALVE AND VALVE OPERATOR COMBINATION

CROSS REFERENCE TO RELATED APPLICATION

This is a continuation-in-part of copending application Ser. No. 087,541 filed Aug. 20, 1987 now U.S. Pat. No. 4,805,451.

BACKGROUND OF THE INVENTION

The present invention relates generally to a system for monitoring and evaluating the condition and performance of a valve and valve operator combination and, more particularly, to such a system which employs means for sensing strains, experienced by the valve yoke in performing such evaluation and monitoring.

Numerous prior art systems have been developed for the evaluation of valve and valve operator systems, particularly systems which are motor or otherwise power driven and are operated from a remote location. Such valves are common in the utility industry and are sometimes used for the protection of power equipment, as well as for the protection of the general public from the release of hazardous materials, either directly or indirectly. One such system is disclosed in U.S. Pat. No. 4,542,649, the disclosure of which is incorporated herein by reference.

The background section of the aforementioned patent describes in detail the problems of the prior art and the need for an improved method for monitoring and evaluating the condition and performance of a valve and valve operator combination, as well as the need for diagnosing particular operational problems. Typically, such prior art systems correlate valve stem load or forces to the displacement of a spring pack by backseating the valve stem against a calibrated load cell while recording the displacement of the spring pack resulting from spring pack compression by utilizing a displacement sensor. The resulting calibration is then used to infer stem loads, seating and backseating forces as a result of spring pack displacement alone.

The problem with the above-described and other prior art systems is that the spring packs typically utilized in conjunction with valve operators have substantial initial compression, requiring that the force on the valve stem build up to a significant predetermined level before the spring pack begins to compress beyond the initial compression and to displace. This feature of the spring pack leaves a large dead zone within which no valve stem force measurement can be made.

In addition, there may be spacing or clearance between the spring pack and the spring pack cavity which allows the spring pack to displace the amount of the clearance in response to a minimum or no corresponding force being imposed on the valve stem. Such clearance adds additional error to such prior art systems. Even if the spring pack was tightly placed within the spring pack cavity with no such clearance, and even if there was no initial compression on the spring pack, the compression of the spring pack tends to be non-linear with respect to the forces encountered by the valve stem. Therefore, spring pack displacement could not provide an accurate indication of valve stem forces over the entire range of spring pack displacement.

Furthermore, it is not uncommon for grease or other lubricants to build up within the spring pack, possibly filling the entire spring pack cavity. Such a buildup of grease or other lubricants can greatly limit spring pack compression, even under the application of very large valve stem forces and, therefore, spring pack displacement would not accurately reflect valve stem forces. Finally, friction forces on the gears within the valve operator could also cause the spring pack to compress, even though no forces are actually being placed upon the valve stem. In short, because of the problems of such prior art systems, an improved means for providing a more accurate and precise measure of valve stem forces is needed. It is also necessary to provide such a measurement method utilizing indirect measurement techniques since the valve stem itself is generally not accessible over the entire valve stroke, therefore making direct measurement difficult and infeasible.

The present invention overcomes the problems of the prior art systems by measuring valve stem forces utilizing sensor means secured to the valve yoke. The invention operates on the premise that the forces on the valve stem are opposed by equal and opposite forces in the valve yoke and that the measurement of yoke deflection or strain results in a proportional indicator of the valve stem forces. Unlike the methods employed by the prior art, such a yoke strain measurement provides a linear measure of valve stem forces from zero force upwardly which is unaffected by all of the above-discussed spring pack anomalies.

The present invention also provides a system for evaluating the condition and performance of the valve and the valve operator, and for identifying malfunctions or other problems in either the valve or valve operator, utilizing the valve stem force measurement (obtained from valve yoke strain measurements) in conjunction with other measurements, including valve stem motion, motor current, spring pack motion and torque and limit switch indications. In addition to diagnosing current valve and valve operator problems, the present invention provides a method for trending changes in overall valve and valve operator conditions in order to predict future valve or valve operator problems.

SUMMARY OF THE INVENTION

Briefly stated, the present invention comprises a device for measuring and indicating the forces on a valve stem and on a valve operator over at least a portion of the valve stroke. The device comprises first strain sensor means secured to the valve yoke for sensing strains experienced by the valve yoke. The sensed strains are proportional to the forces on the valve yoke and are equal and opposite to the forces on the valve stem. The first strain sensor means also generates electrical signals proportional to the forces on the valve stem. Second strain sensor means are secured to the valve operator for sensing strains experienced by the valve operator and for generating electrical signals proportional to the forces on the valve operator. Display means, electrically connected to the first and second strain sensor means, are provided for receiving the electrical signals and for indicating the forces on the valve stem and valve operator. The present invention further comprises a system for evaluating the condition and performance of a valve and valve operator combination utilizing the first and second strain sensor means and one or more of a plurality of other sensor means, including valve stem motion sensor means, spring pack motion sensor means, motor current sensor means, and torque and limit switch indicating means.

BRIEF DESCRIPTION OF THE DRAWINGS

The foregoing summary, as well as the following detailed description, will be better understood when read in conjunction with the appended drawings. For the purpose of illustrating the invention, there is shown in the drawings several embodiments which are presently preferred, it being understood, however, that this invention is not limited to the precise arrangements and instrumentalities shown. In the drawings:

FIG. 4b is a side elevational view of the tensile strain member of FIG. 4a;

FIG. 4c is a schematic diagram of a preferred strain gage bridge circuit for use in conjunction with the tensile strain member of FIG. 4a;

FIG. 7a is an enlarged sectional view of a valve stem motion sensor means of the type shown in FIG. 1;

FIG. 7b is a schematic representation of the electrical circuitry of the valve stem motion sensor means of FIG. 7a;

DESCRIPTION OF PREFERRED EMBODIMENT

Figure 1:
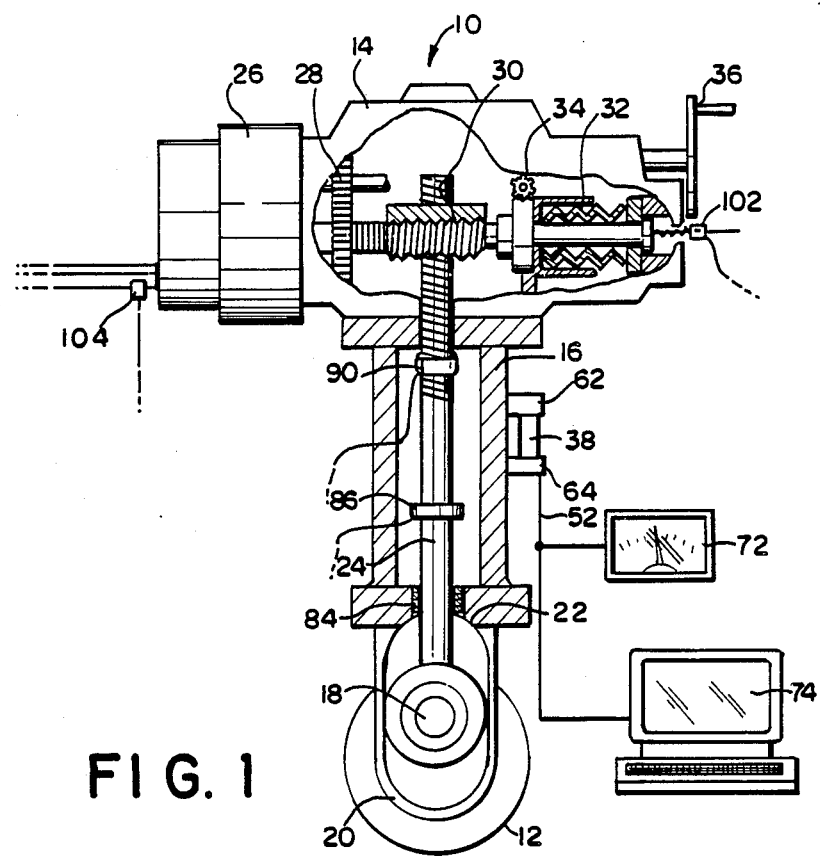
FIG. 1 is an elevational view of a motor operated gate valve shown partially in section and partially broken away, with the gate partially open and with a first strain sensor means secured to the yoke in accordance with the present invention.

Referring now in greater detail to the drawings, in which like numerals indicate like elements throughout, there is shown in FIG. 1 an elevational view, partially broken away and partially in section, of a motor operated gate valve combination 10. The motor operated gate valve 10 is a type which is generally well known in the art and is commercially available from a variety of sources. The motor operated gate valve 10 includes a valve member 12 and a valve operator 14 which are connected together by a valve yoke 16. The valve member or valve 12 includes a movable valve gate 18, a fixed valve seat 20 and a fixed valve backseat 22. The valve gate 18 is movable between a "seated" position in which it engages the valve seat 20 (see FIG. 2), thereby closing the valve 12 and a "backseated" position in which it engages the valve backseat 22 (see FIG. 3), thereby fully opening the valve 12. As shown in FIG. 1, the valve gate 18 is in an intermediate position part way between the seated and backseated positions.

The valve gate 18 moves between the seated and backseated positions by the action of a valve stem 24, one end of which is secured to the valve gate 18. The valve stem 24 extends through suitable openings in the valve 12 and valve yoke 16 with the other end extending into the valve operator 14, as shown.

The valve operator 14 is comprised of a motor 26 which in the present embodiment is shown as being an electric motor. The output shaft of the motor 26 is connected through suitable reduction gears 28 to a combination worm and worm gear, shown collectively as 30. The worm gear includes an internal threaded opening (not shown) which serves as a stem nut to engage threading on the upper end of the valve stem 24. Rotation of the drive shaft of the motor 26 results in rotation of the worm and worm gear 30 and corresponding vertical movement of the valve stem 24. The direction of movement of the valve stem 24 depends upon the direction of movement of the output shaft of the motor 26. Of course, the vertical movement of the valve stem 24 results in corresponding movement of the valve gate 18.

The distal (rightmost) end of the worm is connected to a spring pack 32 in a manner well known in the art. A separate small gear 34 is also connected to the worm by way of the spring pack 32. The gear 34, in turn, is connected to a torque switch (not shown) having two sets of electrical contacts for deactivating the motor 26 when the gear 34 is turned due to a displacement of the spring pack 32. One set of contacts called the open torque switch opens to deactivate the motor 26 for spring pack motion in one direction corresponding to impeded stem motion in the valve opening direction and the other set of contacts called the close torque switch opens to deactivate the motor 26 for spring pack motion in the other direction corresponding to impeded stem motion in the valve closing direction. Also associated with the valve operator 14 is a manual actuator 36 to permit the valve operator 14 to be operated independently of the motor 26.

The structure thus far described is typical of that of a motor operated gate valve of the type with which the present invention may be employed. It will be appreciated by those skilled in the art that the motor operated gate valve 10 is merely an illustrative example of one valve with which the present invention may be employed and that the present invention may alternatively be employed with any other type of valve (such as a globe valve) or with any other type of valve operator, such as a pneumatic or hydraulic valve operator (not shown). The present invention may also be employed with a butterfly valve to sense stem torque. Further details of the structure and operation of the motor operated gate valve 10 will be presented only insofar as is necessary for an understanding of the structure and operation of the present invention as described below.

Figure 4A:
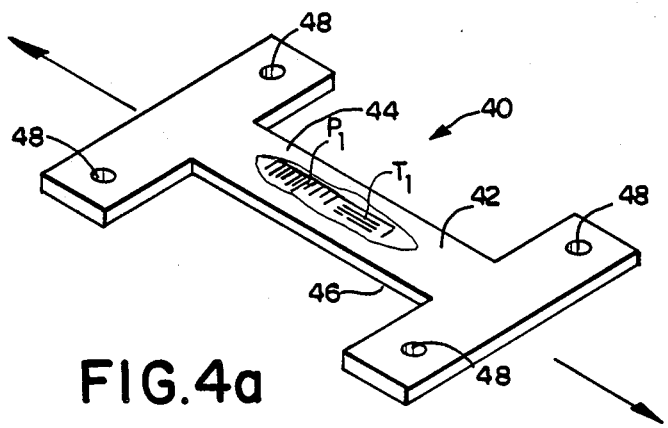
FIG. 4a is a greatly enlarged perspective view of a preferred embodiment of a tensile strain member employed in the strain sensor means shown in FIG. 1.
Figure 4B:
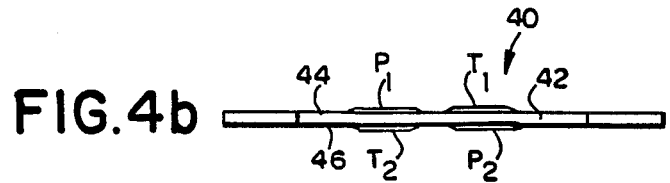

A first strain sensor means or yoke strain sensor 38 is secured to the valve yoke 16 for sensing strains experienced by the valve yoke 16. In the present embodiment, the yoke strain sensor 38 is comprised of a tensile strain member 40 which is best seen in FIGS. 4a and 4b. The tensile strain member 40, in the present embodiment, is a generally flat elongated beam 42 having first and second elongated surfaces 44 and 46 (see FIG. 4b) on opposite sides. In the present embodiment, the beam 42 is in the shape of an "I" beam in a top plan view. However, the present invention is not limited to a particular shape for the beam 42. The beam 42 is preferably formed of a high tensile strength metallic material such as beryllium copper due to its spring-like properties. However, the beam 42 could be formed of any other suitable material. Mounting holes 48, in the present embodiment four such mounting holes, extend through the beam 42 to facilitate mounting the beam 42 onto the valve yoke 16 in a manner which will hereinafter become apparent.

At least one strain gage is secured or bonded to the tensile strain member 40. In the present embodiment, there are four such strain gages, T1, P1, T2 and P2, secured to the tensile strain member 40. The strain gages are of a type well known in the art and generally commercially available. Two of the strain gages, T1 and T2, are longitudinally oriented with respect to the tensile strain member to experience and indicate longitudinal or tensile strain. The other strain gages, P1 and P2, are transversely oriented with respect to the tensile strain member 40 to experience transverse or Poisson strain. In general, Poisson strain is opposite in sense to tensile, and is equal to about one-third of the magnitude of tensile strain. The use of multiple strain gages having different orientation is superior to a single strain gage due to increased sensitivity and inherent thermal compensation. In the present embodiment, one of the longitudinally oriented strain gages, T1, and one of the transversely oriented strain gages, P1, are secured to the first surface 44 of the tensile strain member 40 and the other two strain gages T2 and P2 are secured to the second surface 46 of the tensile strain member 40. The strain gages, T1, P1, T2 and P2 are secured or bonded to the tensile strain member 40 utilizing suitable epoxy or other adhesives, or in any other manner known in the art. While, in the present embodiment, the strain gages are secured to the tensile strain member 40 in the specific manner, locations and orientations shown and described, they could be secured to the tensile strain member 40 in some other manner, location and/or orientation.

Figure 4C:
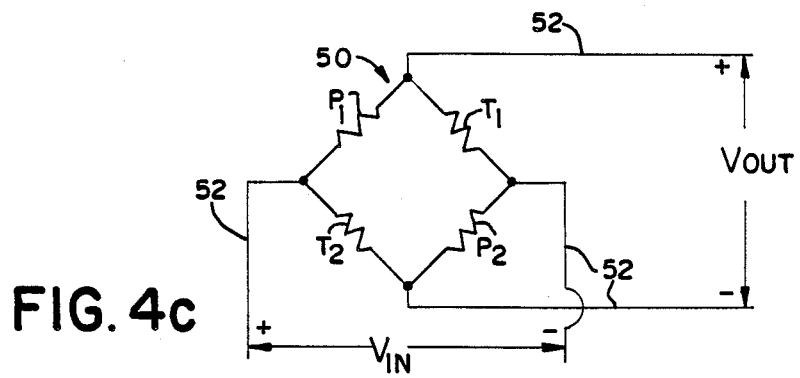

The yoke strain sensor 30 further includes a four active arm strain gage bridge circuit 50 as schematically illustrated in FIG. 4c. The strain gage bridge circuit 50 is made up of the electrically connected strain gages, T1, P1, T2 and P2, utilizing suitable electrical conductors, preferably insulated wires or leads 52. Strain gage bridge circuits of the type illustrated in FIG. 4c are generally well known in the art and, therefore, need not be described in detail. Suffice it to say that upon the application of a D.C. excitation voltage $V_{IN}$ to the input terminals of the strain gage bridge circuit 50, electrical signals, proportional to the forces on the valve yoke 16 are generated by the bridge circuit 50 and appear on the output terminals as a D.C. voltage $V_{OUT}$. The magnitude of the output voltage $V_{OUT}$ is proportional to the magnitude of the applied tensile strain which occurs when the tensile strain member 40 is placed in tension, as will hereinafter become apparent.

Figure 5:
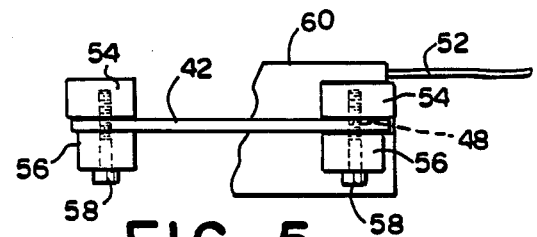
FIG. 5 is an enlarged elevational view, partially broken away, of the strain sensor means of FIG. 1.

As best seen in FIG. 5, the tensile strain member 40 is secured on each longitudinal end to mounting means, in the present embodiment comprising mounting blocks 54 and slightly smaller clamping blocks 56. The clamping blocks 56 are secured to the mounting blocks 54 utilizing suitably sized screws or bolts 58 which extend through the holes 48 in the tensile strain member 40 and into suitable taped openings in the mounting blocks 54. After the mounting blocks 54 and clamping blocks 56 have been secured to the tensile strain member 40, the entire assembly is encapsulated with a flexible, stretchable material, such as rubber 60, to provide environmental protection for tensile strain member 40 and the various strain gages. The rubber material 60 provides the required protection without appreciably altering the spring constant of the assembly. As best seen in FIG. 5, the distal ends of the mounting blocks 54 ar not encapsulated in the rubber material 60 in order to permit the assembly to be secured to the valve yoke 16, as will hereinafter be described. Of course, the leads 52 extend outwardly from the encapsulating rubber 60.

Figure 6:
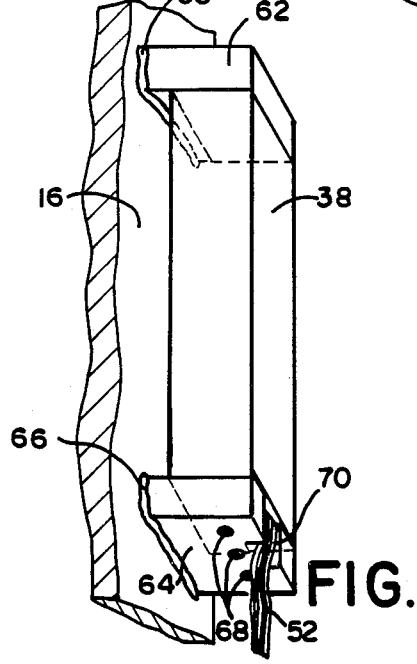
FIG. 6 is an enlarged perspective view of the strain sensor means of FIG. 1.

The yoke strain sensor 38 is secured to the valve yoke 16 by a pair of mounting posts 62 and 64 (see FIG. 6). Before installing the yoke strain sensor 38, the mounting posts 62 and 64 are secured to the valve yoke 16 in a predetermined, precisely spaced relationship to create a predetermined initial tension in the yoke strain sensor 38 when it is installed. The predetermined initial yoke strain sensor tension is created to facilitate the sensing of compressive strains in the valve yoke 16 due to tensile forces on the valve stem 24 in addition to the sensing of tensile strain in the valve yoke 16 due to compressive forces in the valve stem 24. The mounting posts 62 and 64 may be secured to the valve yoke 16 utilizing soldering, brazing, welding, epoxy or some other kind of adhesive, or in any other manner known in the art.

In order to establish the precise predetermined spacing required between the mounting posts 62 and 64, a spacer block (not shown) may be positioned between the mounting posts. Once the mounting posts 62 and 64 are secured to the valve yoke 16 with the predetermined spacing, the spacer block is removed and the yoke strain sensor 38 is installed between the mounting posts 62 and 64, as best seen in FIG. 6. A plurality of securing means, such as screws 68, are employed to secure the exposed portions of the mounting blocks 54 to the mounting posts 62 and 64. The spacer block (not shown) used in installing the mounting posts 62 and 64 is longer than the yoke strain sensor 38, so that when the mounting screws 68 are tightened to pull the mounting blocks 54 into engagement with the mounting posts 62 and 64, the desired predetermined strain is placed upon the tensile strain member 40. A suitably sized notch 70 is provided in mounting post 64 to accommodate the leads 52 of the yoke strain sensor 38.

With the yoke strain sensor 38 secured to the valve yoke 16, between the mounting posts 62 and 64, as shown and described, the strain experienced by the valve yoke 16 is amplified as applied to the yoke strain sensor 38. The amount of amplification is equal to the ratio of the effective mounting distance between the mounting posts 62 and 64 and the free length of the tensile strain member 40 inside the mounting and clamping blocks 54 and 56, respectively. The amplification factor effectively increases the sensitivity of the yoke strain sensor 38 with respect to the sensing and indication of strain experienced by the valve yoke 16.

At least one display means is electrically connected to the yoke strain sensor means 38 for receiving the electrically generated signals and for indicating the forces on the valve stem 24. In the present embodiment, as shown in FIG. 1, the display means is comprised of a voltage sensitive meter 72 electrically connected by the leads 52 to the yoke strain sensor 38. The meter 72 indicates both the output voltage and the polarity of the voltage generated by the yoke strain sensor 38, as determined from the strain gage bridge circuit 50 described above. As indicated above, the magnitude of the voltage is proportional to the magnitude of the forces on the valve stem 24. The polarity of the voltage indicates whether the forces on the valve stem 24 are compressive or tensile. Alternatively, the display means could comprise a computer system 74 (shown diagrammatically in FIG. 1 as a computer terminal or CRT screen), further details of which will hereinafter become apparent.

Figure 2:
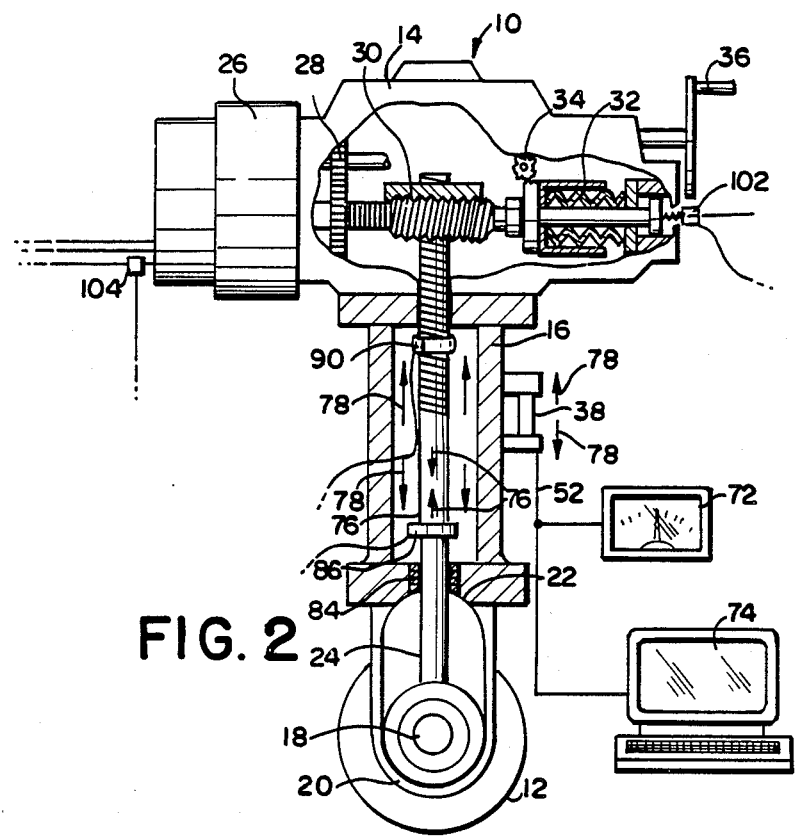
FIG. 2 is a similar elevational view of the motor operated valve of FIG. 1 with the gate in the seated position.
Figure 3:
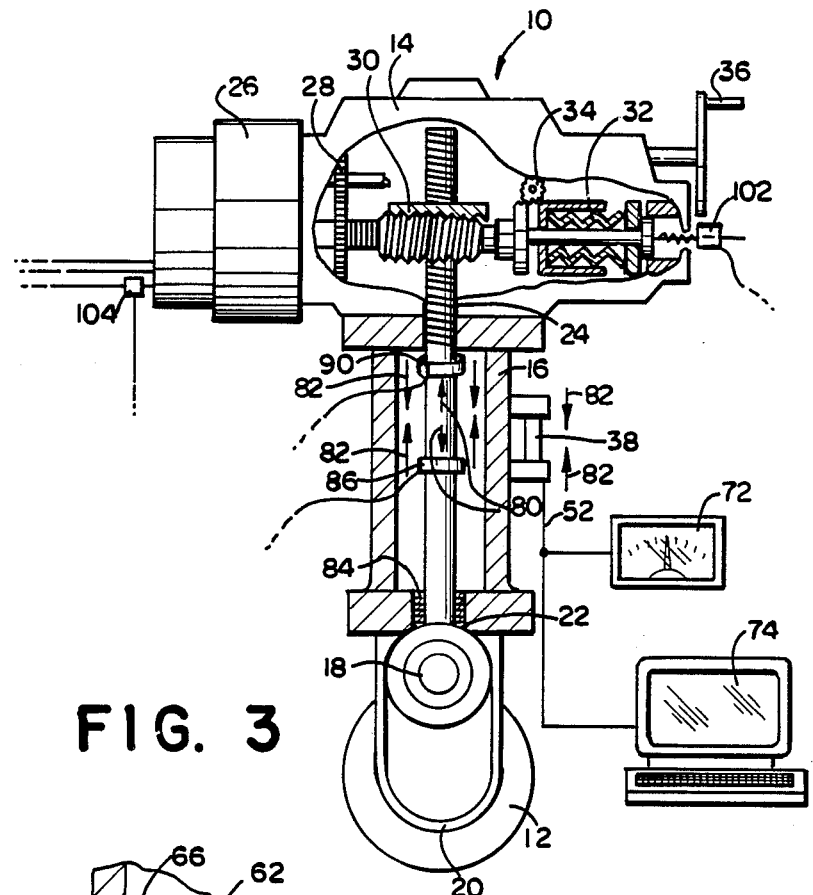
FIG. 3 is a similar elevational view of the motor operated valve of FIG. 1 with the gate in the open position.

Referring now to FIGS. 1, 2 and 3, a brief description of the functioning of the yoke strain sensor 38 will be presented.

When the valve 12 is to be closed, electrical power is supplied to the motor 26 which operates through the reduction gears 28 to drive the worm and worm gear 30 to rotate in a first direction. Rotation of the worm and worm gear 30 and the internal stem nut (not shown) moves the valve stem 24 downwardly, thereby moving the valve gate 18 toward the valve seat 20. When the valve gate 18 engages the valve seat 20 (see FIG. 2), the downward motion of the valve stem 24 substantially stops, in turn causing the stem nut and worm gear to also stop. The worm, which continues to rotate because of the driving force of the motor 26 and reduction gears 28, is forced to move axially (toward the right when viewing FIG. 2), pushing the spring pack 32 toward the right (when viewing FIG. 2) and compressing the spring pack 32 to the position shown in FIG. 2. The rightward movement and compression of the spring pack 32 results in rotation of the gear 34 which, in turn, opens the torque switch (not shown) to cut off the power to stop the motor 26. The delay in time which occurs between the valve gate 18 engaging the valve seat 20 and the motor 26 being stopped, although relatively brief, still results in an increase in the compressive forces on the valve stem 24, indicated by arrows 76, which continue to build until the motor 26 is actually stopped. The valve stem compressor forces 76 cause equal and opposite tensile forces, shown by arrows 78, in the valve yoke 16, and the resulting yoke deflection or strain is sensed by the yoke strain sensor 38, as previously described.

In opening the valve 12, the motor 26 drives the worm and worm gear 30 in the opposite direction, resulting in the valve gate 18 moving upwardly away from the valve seat 20 and toward the valve backseat 22. When the valve gate 18 reaches the backseat 22, as shown in FIG. 3, the motion of the valve stem 24 again substantially stops, causing the stem nut and worm gear to stop. Again, since the motor 26 continues to operate, the worm continues to rotate and, therefore, must move axially. However, in this case, the axial movement of the worm is pulling against (toward the left when viewing FIG. 3) but is still compressing the spring pack 32, to the position as shown in FIG. 3. As the spring pack 32 is compressed, the gear 34 rotates to open the torque switch (not shown) to cut off the power to stop the motor 26. When the valve gate 18 is fully engaged against the backseat 22, the delay in stopping the motor 26 results in an increase in the tensile forces in the valve stem 24. The valve stem tensile forces, shown as arrows 80, cause equal and opposite compressive forces, shown as arrows 82, in the valve yoke 16. The resulting deflection or strain of the valve yoke 16 is sensed by the yoke strain sensor 38. As previously discussed, the polarity of the signal generated by the yoke strain sensor 38 is the opposite of that generated upon closing of the valve 12.

As best shown in FIG. 1, the portion of the valve 12 through which the valve stem 24 extends, is packed with a suitable packing material 84 of a type well known and conventionally used in the art. The purpose of the packing material 84 is to prevent fluid passing through the valve 12 from inadvertently leaking into the valve yoke 16. The packing material 84 places some forces upon the valve stem 24. If excessive packing forces are present, such forces are indicated during the closing of the valve 12 as additional compression in the valve stem 24 and, therefore, additional tension in the valve yoke 16 prior to seating of the valve gate 18. Correspondingly, when the valve 12 is opening, such packing forces will be indicated as an additional tension in the valve stem 24 and corresponding additional compression in the valve yoke 16 prior to backseating of the valve gate 18. In either situation, such additional forces are sensed by the yoke strain sensor 38.

The strains on the valve yoke 16 accurately reflect all of the reactive forces experienced by the valve yoke 16 and, correspondingly, the valve stem 24. These strains are completely independent of all other potentially misleading effects to provide an accurate and relatively precise measurement. However, it is desirable to calibrate the yoke strain sensor 38 before making such measurements. Several alternative methods may be employed for such calibration. The yoke strain sensor 38 may be calibrated by measuring its output voltage while mechanically or hydraulically imparting a known or accurately measured axial force or load to the valve yoke 16 after placing the valve 12 in a condition in which the imposed load is not shared by the valve stem 24, i.e., before the valve 12 and valve operator 14 are assembled together or after assembly in the valve stem thread clearance direction. Alternatively, the yoke strain sensor 38 may be calibrated by measuring the output voltage while mechanically or hydraulically imparting a known or measured axial reactive force or load to the valve stem 24 of a fully assembled valve. Preferably, the forces or load are applied to the stem during important portions of the valve stroke, such as a fully opened valve 12 or a fully closed valve 12, in which the applied load is experienced in total by both the valve stem 24 and the valve yoke 16.

While the foregoing described methods are acceptable for calibrating the yoke strain sensor 38, they are not always feasible, particularly in the case of a valve 12 which has been previously installed and is operational. The preferred calibration method is to temporarily secure a second strain sensor means directly to the valve stem 24. The second strain sensor means or stem strain sensor 86 is employed for directly sensing strains experienced by the valve stem 24 and for generating electrical signals proportional thereto. The valve stem strain sensor 86 may be any type of strain sensor well known in the art, for example, a diametral strain sensor, a circumferential strain sensor, a longitudinal strain sensor, or any other type of strain sensor for measuring the stem strains that result when the valve 12 is operated in a large load gradient region of its stroke, such as seating, unseating, backseating, etc. In this manner, calibration is accomplished by applying any force or load (whether known or not) to the valve stem 24 and establishing the simple relationship between the stem strains measured directly by the valve stem strain sensor 86 and the forces measured by the yoke strain sensor 38.

In many operating conditions, it will be necessary to remove the valve stem strain sensor 86 from the valve stem 24 to permit full operation of the valve 12, particularly if the valve stroke is too great to allow it to remain in place without damaging the valve stem strain sensor 86 or otherwise affecting valve operation. However, the calibrated yoke strain sensor 38 may remain permanently attached to the valve yoke 16 to provide signals proportional to the forces on the valve stem 24 any time the valve 12 is operated.

As previously described, a relatively inexpensive meter 72 may be employed in conjunction with the yoke strain sensor 38 to provide an operator with sufficient information concerning the forces on the valve stem 24 to permit the operator to control the seating or the forces applied during manual operation. Similarly, an operator, at a remote location, opening or closing the valve utilizing the valve operator 14, is provided with information for controlling the seating or forces applied to the valve stem 24 during operation.

The calibrated yoke strain sensor 38, in conjunction with the meter 72 or computer terminal or CRT screen 74, is sufficient to permit the operator to diagnose many problems which could occur during operation of the valve 12. Examples of the problems which could be diagnosed include excessive or insufficient valve gate seating forces; excessive or insufficient forces for unseating the valve gate 18; excessive or insufficient packing forces imposed on the valve stem 14 by the packing material 84; a tapered stem condition which is determined by a symmetrical increasing or decreasing of packing forces on opening versus closing; offset gears or gears having damaged or missing teeth which are discernible as either a sine wave or spiked modulation of force magnitude at the gear rotational rate and a damaged seat condition discernible from an unusual or changing pattern in the seating or unseating valve stem force signature.

As will hereinafter be described, by combining the information pertaining to the forces on the valve stem 24 obtained by the yoke strain sensor 38 with information obtained from additional sensors (hereinafter described), a system is developed for evaluating the condition and performance of both the valve 12 and the valve operator 14 to diagnose many additional problems which may occur.

Referring now to FIGS. 7a and 7b, there is shown a device for detecting axial motion of a valve stem 24 which has been installed within and is surrounded by a valve yoke 16 so that the ends of the valve stem 24 are unavailable for the installation of prewound coil. The axial motion detection device or valve stem motion sensor, shown generally as 90, is comprised of a predetermined length of generally flat, multiconductor cable 92, sometimes referred to as "ribbon" cable, having a first connector component 94 secured to one end and a second connector component 96 secured to the other end. The first connector component 94 has a plurality of individual electrical contacts (not shown), the number of contacts being at least two greater than the number of conductors in the ribbon cable 92. The second connector component 96 similarly has a plurality of electrical contacts, the number of contacts being at least two greater than the number of conductors of the ribbon cable 92. The two connector components 94 and 96 are adapted to be interconnected, as shown in FIG. 7a, with the ribbon cable 92 surrounding the valve stem 24. The length of the ribbon cable 92 is selected to permit the ribbon cable 92 to completely surround the valve stem 24 in close proximity without being in direct contact with the valve stem 24 in a manner which would in any way impair axial movement of the valve stem 24.

The conductors of the ribbon cable 92 are electrically connected to the contacts of the first and second connector components 94 and 96 in such a manner that when the connector components 94 and 96 are coupled together, as shown in FIG. 7a, the ribbon cable 92 forms two generally parallel but electrically independent coils, each of the coils extending around the valve stem 24, as shown schematically in FIG. 7b. One way of connecting the conductors of the ribbon cable 92 to the first and second connector components 94 and 96 is to offset the connectors by two contacts so that the first connector component 94 has two open or unused contacts, A and B on one end, and the second connector components 96 has two open or unused contacts, A and B on the other end. In this manner, one complete coil is formed between the B contacts and the other complete coil is formed between the A contacts. Of course, any other suitable method of connecting the conductors of the ribbon cable 92 to provide two independent generally parallel coils could alternatively be employed.

In operation, a current source is electrically connected to both ends of one of the coils to provide for a flow of current through the one coil. Axial movement of the valve stem 24 through the coils results in a voltage being induced in the other coil in a manner well known in the art. The induced voltage which can be received from the other pair of unused contacts is proportional to the velocity of the axial movement of the valve stem 24 through the coils. The polarity of the induced voltage indicates the direction of axial movement of the valve stem 24 through the coils.

The motion detecting device 90, as described, could alternatively be employed for in situ detection of axial movement of any generally cylindrical member, particularly in a situation in which both ends of the member are unavailable for the installation of a prewound coil. The ends of the member may be unavailable because they are already attached to another structure or because they are otherwise inaccessible. In employing the device 90 for in situ detection of axial movement of a generally cylindrical member, the structure and above-described operational features of the device 90 remain the same. However, the length of the ribbon cable 92 may vary, depending upon the outer dimension of the cylindrical member being surrounded.

The coil within which the voltage is induced is electrically connected to a suitable display means in a manner well known in the art. The display means could be a meter, such as meter 72 (FIG. 1). Alternatively, the display means could be a computer system, such as computer system 74.

As previously indicated, information concerning the velocity and direction of movement of the valve stem 24 which is obtained from the motion detecting device 90 can be used in conjunction with the information pertaining to the forces on the valve stem 24 obtained by the yoke strain sensor 38. For example, the information could be used in diagnosing a loose stem nut condition, a motor 26 which has been improperly connected and is turning in the wrong direction, changes which may occur in lost motion areas, teeth which may be missing from gears, and inappropriate system clearances.

Figure 8:
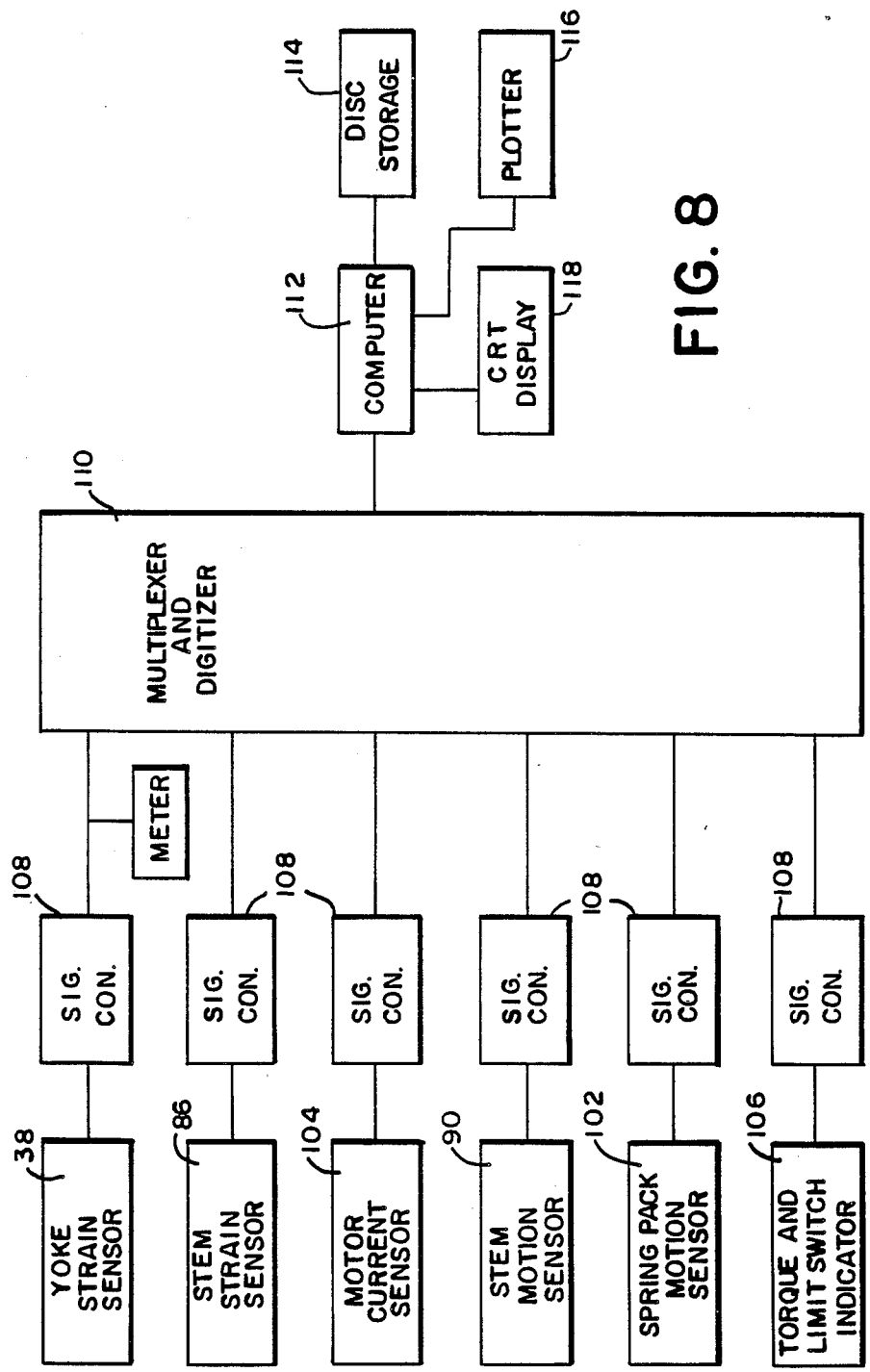
FIG. 8 is a schematic bock diagram of a preferred system for evaluating valve and valve operator condition and performance in accordance with the present invention.
Figure 9A:
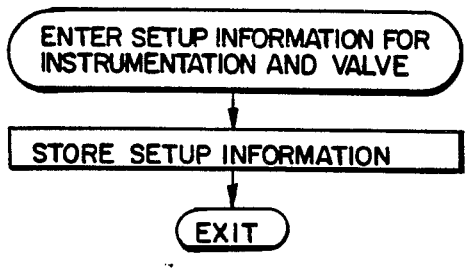
FIGS. 9a-9k are a flow diagram of a preferred embodiment of a computer program for the present invention.
Figure 9B:
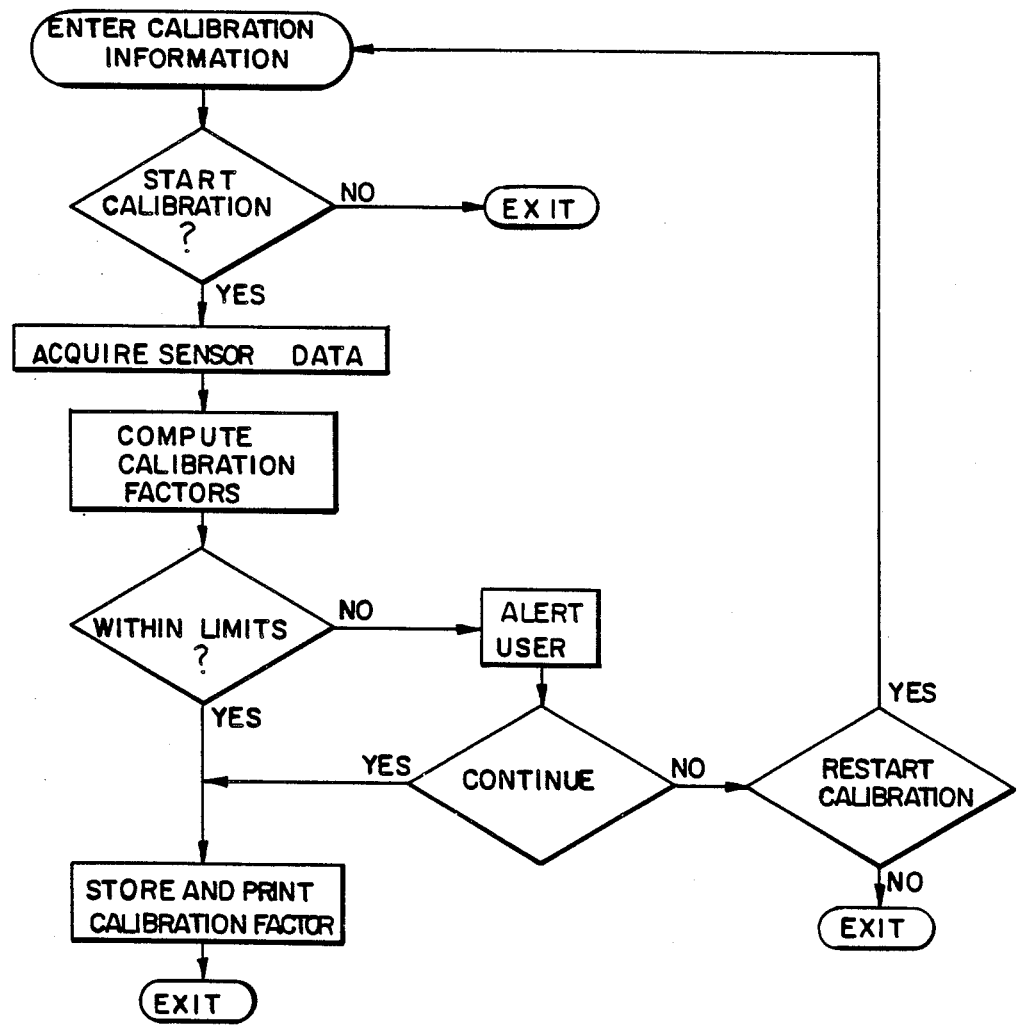
Figure 9C:
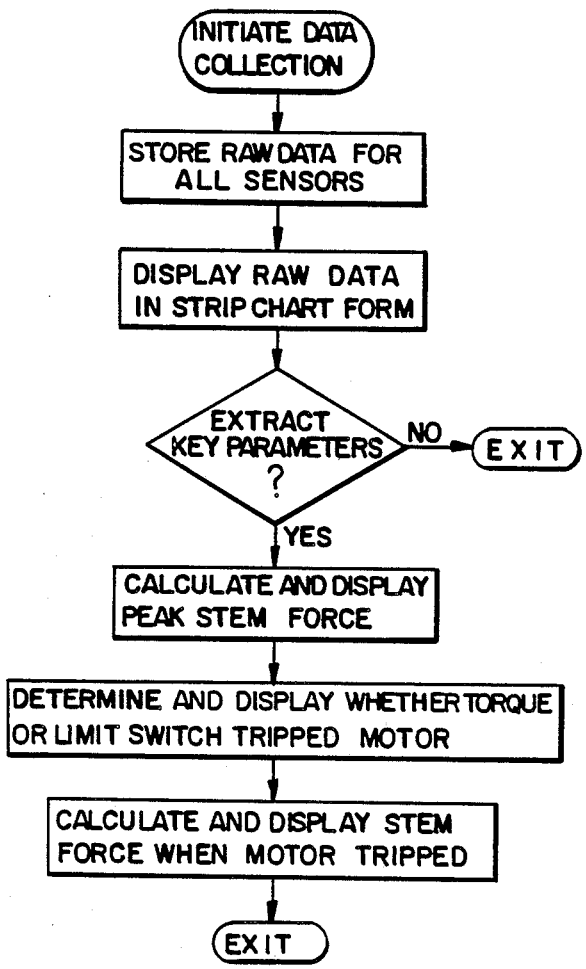
Figure 9D:
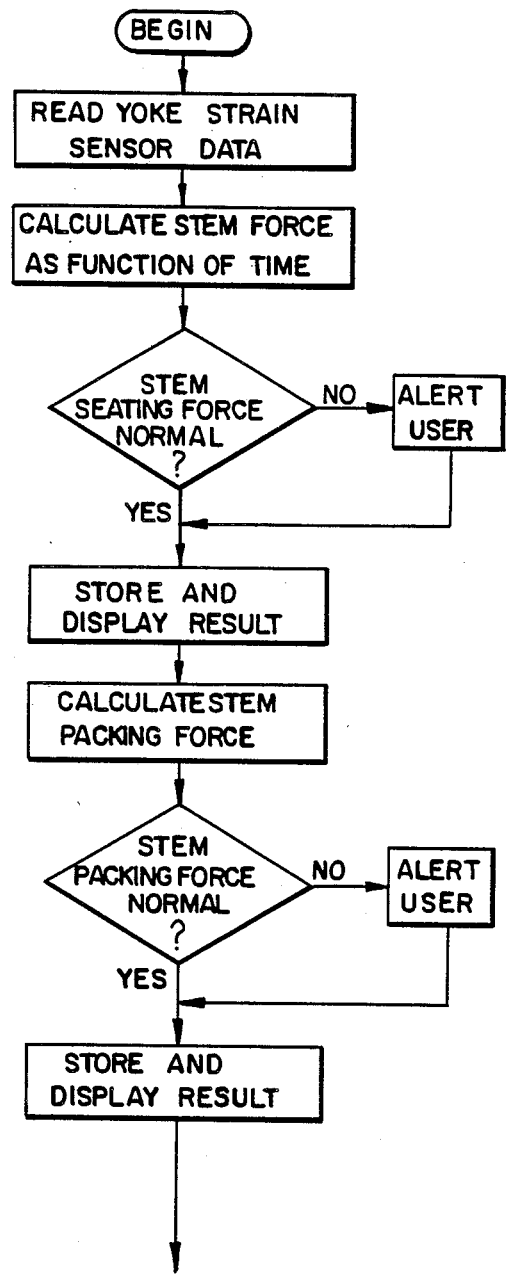
Figures 9E, 9F:
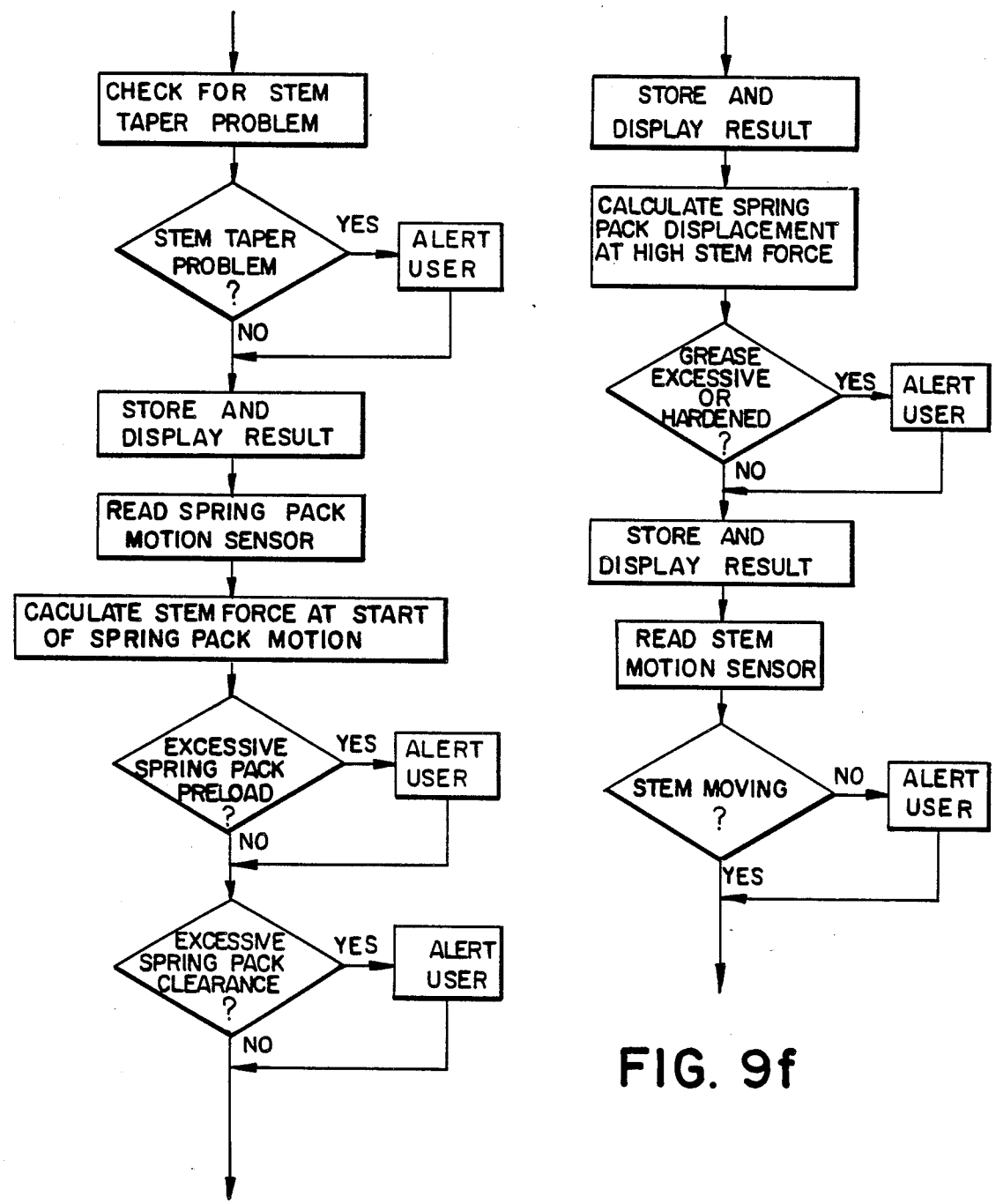
Figures 9G, 9H:
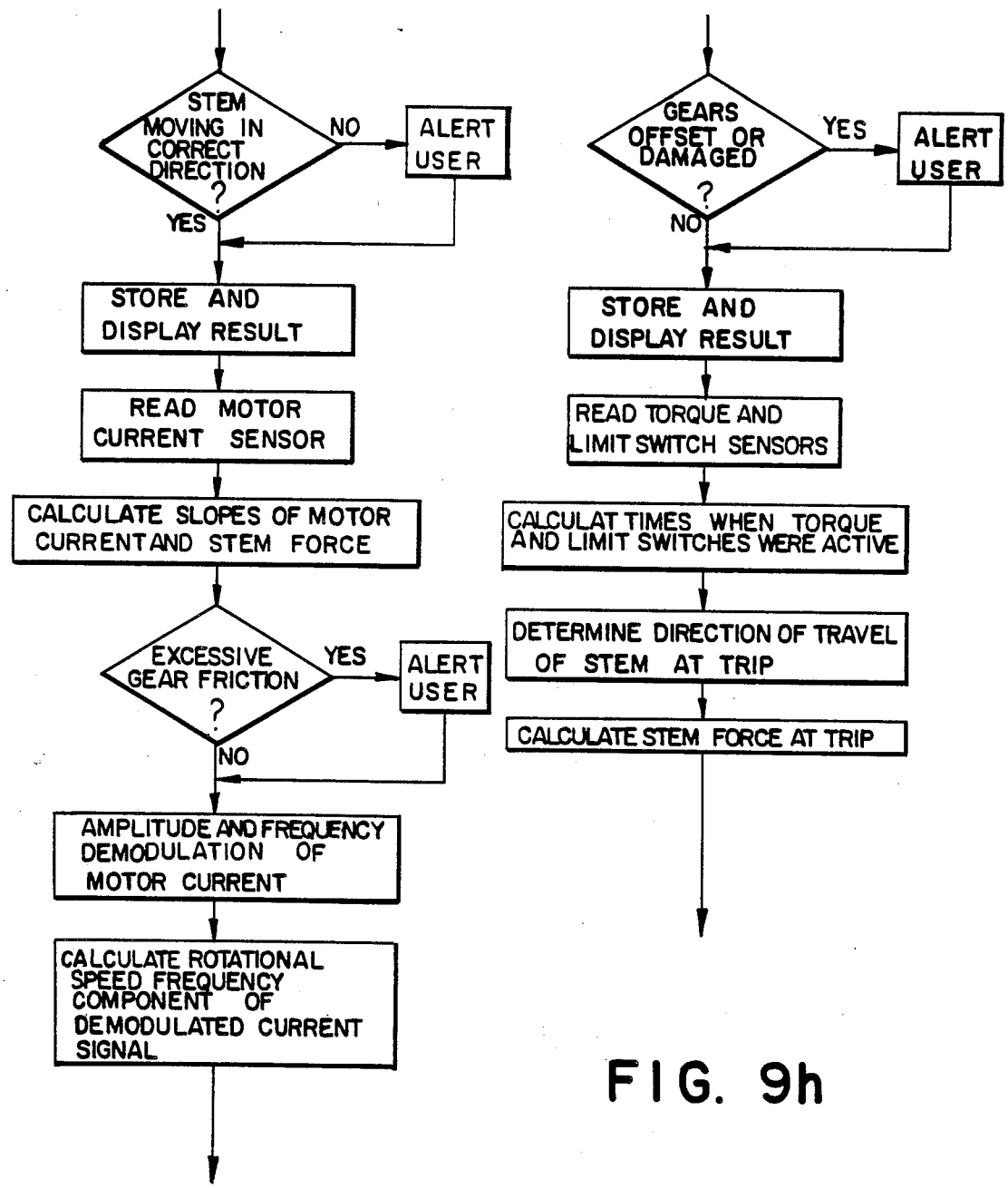
Figure 9I:
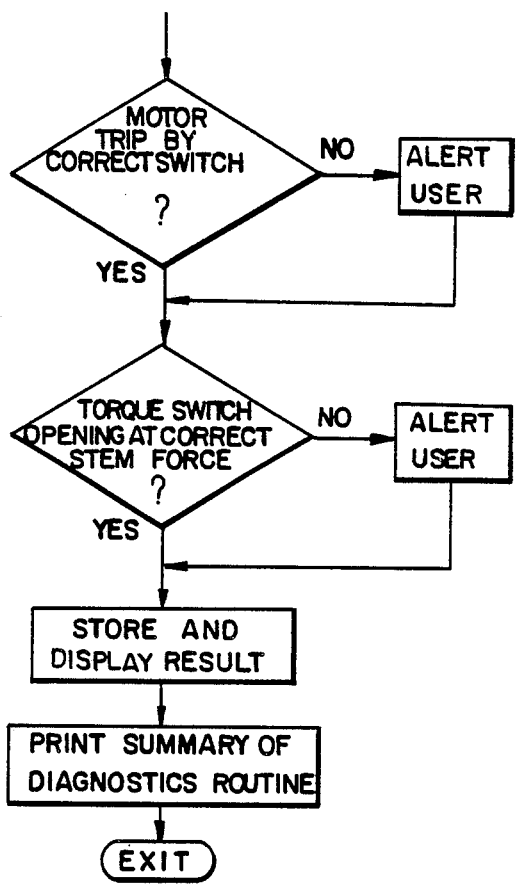
Figure 9J:
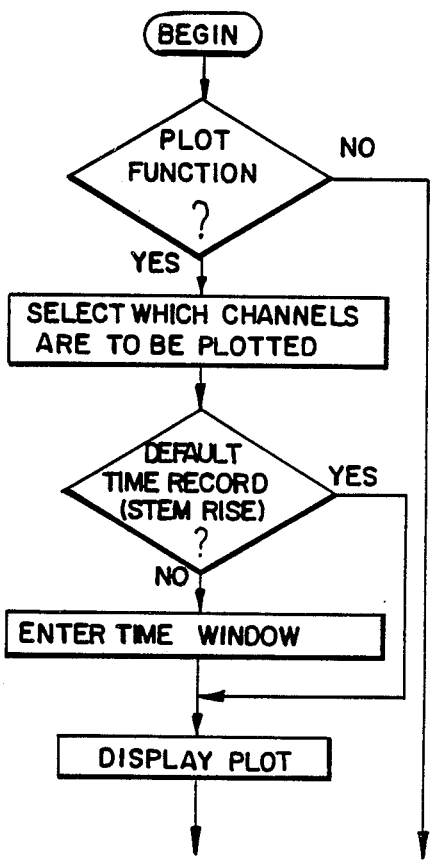
Figure 9K:
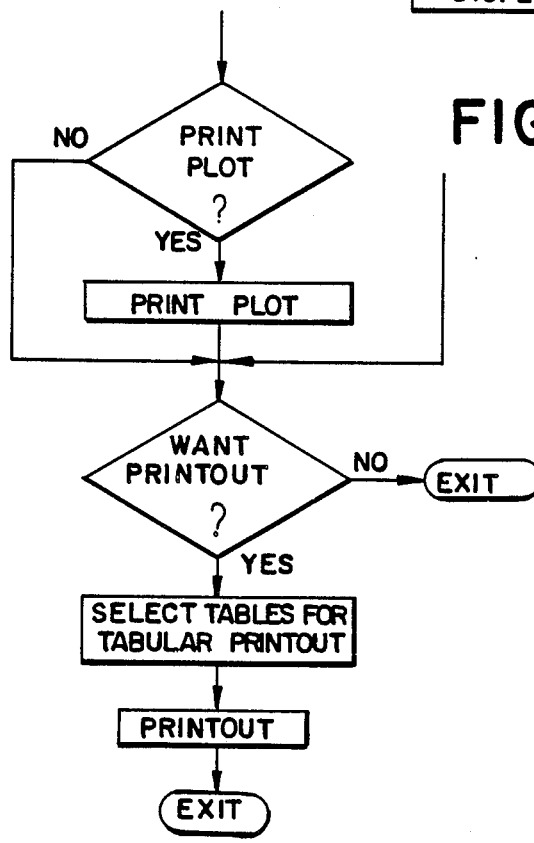

As indicated above, the yoke strain sensor 38 may be employed as part of a system for evaluating the condition and performance of a valve and valve operator combination, such as motor operated gate valve 10. A schematic block diagram of a preferred embodiment of such a system is shown in FIG. 8, the system being shown generally by reference numeral 100. The system 100 receives signals from the yoke strain sensor 38 and the valve stem motion sensor 90 in the manner as previously described. Similarly, if available, the system 100 receives signals from the valve stem strain sensor 86. Three other means are employed for providing specialized signals to the system 100. A spring pack sensor means, in the present embodiment a spring pack motion sensor 102 is secured to the distal (rightmost when viewing FIG. 1) end of the spring pack 32 for detecting the motion and direction of movement of the spring pack 32. The spring pack motion sensor 102 generates electrical signals with a magnitude proportional to the velocity of spring pack movement and with a polarity indicative of the direction of spring pack movement. The spring pack motion sensor 102 is of a type generally well known in the art and commercially available.

Motor current sensor means, in the present embodiment a motor current sensor 104 secured to at least one of the power lines to the motor 26 is provided for detecting the flow of current through the motor 26 and for generating electrical signals proportional to the motor current. The motor current sensor 104 is also of a type generally well known in the art and generally commercially available.

Torque and limit switch indicating means, in the present embodiment a torque and limit switch indicator 106 electrically connected to the torque and limit switches (not shown) associated with the valve and valve operator 14 is provided for detecting the state of the torque and limit switches and for generating electrical signals representative of the state of the torque and limit and switches.

Figure 10:
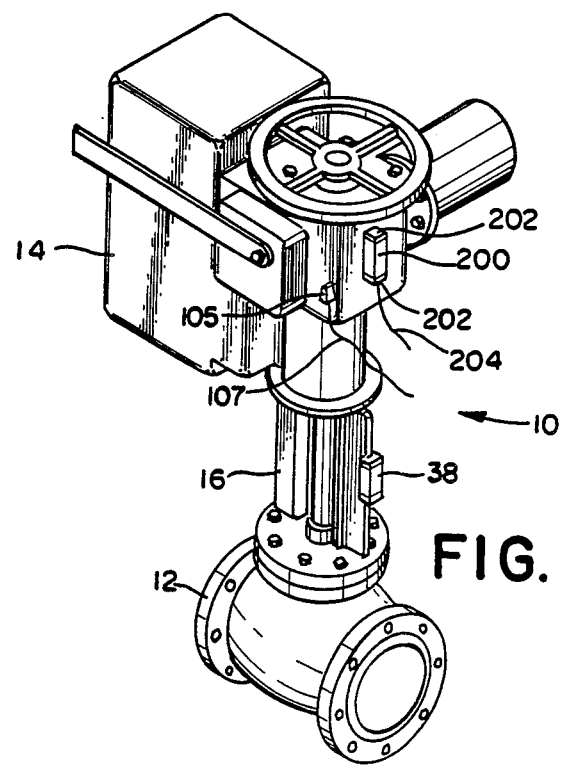
FIG. 10 is a perspective view of the motor operated gate valve of FIG. 1 with a second strain sensor means and an accelerometer secured to the valve operator.

Vibration measuring means, in the present embodiment, an accelerometer, 105 is secured to the valve operator 14 as shown in FIG. 10. The accelerometer 105 detects vibrations occurring in the valve operator which may result from various abnormalities in the operation of the gears within the valve operator and/or vibration resulting from abnormal operation of the spring pack, as well as normal valve and valve operator vibrations. The accelerometer 105 is of a type generally well known in the art and generally commercially available. The accelerometer 105 generates electrical signals proportional to the sensed vibrations in a manner which is also generally well known in the art. The generated electrical signals are fed along line 107 to the display means (not shown on FIG. 10).

The evaluation system 100 further comprises a series of signal conditioners 108, associated with the various sensors and indicators for filtering, amplifying and otherwise conditioning the various received electrical signals to predetermined levels suitable for further processing. The signal conditioners 108 are of a type which are generally well known in the art and commercially available.

The system 100 also includes a multiplexer and digitizer 110 which is electrically connected to each of the signal conditioners 108. The multiplexer and digitizer 110 receives the conditioned analog electrical signals from the signal conditioners 108, multiplexes the signals, preferably on a time division basis, and digitizes or converts the analog signals to digital form. The multiplexer and digitizer is of a type generally well known in the art and commercially available.

The system 100 further includes an analysis section comprised of a digital computer 112 and associated peripheral equipment, including a memory, in the present embodiment disk storage 114, a hard copy output means, in the present embodiment an XY or similar type of plotter 116 and an input/output device, in the present embodiment a CRT display 118 which may include a keyboard (not shown).

The computer 112 receives the multiplexed digital signals representative of the various sensors and indicators from the multiplexer and digitizer 110. The computer 112, operating in accordance with a previously stored program, stores the digital signals or samples representative of the various forces, motions, etc. concerning the valve 12 and valve operator 14 to establish a digital record for each force, motion, etc. for predetermined time periods. The computer 112 then compares various ones of the digital records with others of the digital records to more clearly define valve and valve operator operation. In addition, the computer 112 compares various of the digital records with previously stored reference digital records of the corresponding force, motion, etc. expected to be experienced during normal operation and indicates deviations resulting from the comparison. The computer also compares the digital records for each force, motion, etc. with previously stored digital records for the same force, motion, etc. for indicating changes and trends in the force, motion, etc. over time to predict future valve and valve operator operation. Finally, the computer 112 displays the various force, motion, etc. digital records in a humanly readable form, either on the plotter 116 or on the CRT screen 118 to permit the operator to identify disruptions in normal valve operator to valve functioning.

The computer 112 may utilize information obtained from the yoke strain sensor 38 in combination with the information obtained from the spring pack motion sensor 102 to diagnose a condition of excessive spring pack free load discernible by an already large stem force at the time the spring pack starts to move. The same combination can be employed to indicate a grease-filled or grease-hardened spring pack identifiable by small spring pack motion with a large corresponding stem force buildup or excessive spring pack clearance, a condition discernible by spring pack motion associated with no corresponding stem force buildup.

Similarly, the computer 112 can utilize the information obtained from the yoke strain sensor 38 in combination with the motor current sensor 104 to diagnose a condition of excessive gear friction discernible by an increase in motor current and a corresponding decrease in valve stem force. Similarly, an offset or damaged gear condition could be diagnosed through amplitude or frequency modulation of the motor current at a modulation rate equal to the gear rotation speed.

By combining the information obtained from the yoke strain sensor 38 with the information obtained from the torque and limit switch indicator 106 (FIG. 8), the computer can diagnose the condition of a misadjusted torque switch indicated by a seating or backseating valve stem force which is either too large or too small from that normally expected. Similarly, a misadjusted limit switch could be identified if the motor is stopped before the torque switch opens upon valve seating. The condition of a misadjusted bypass switch is indicated when the motor is allowed to be stopped by the torque switch on unseating of the valve.

The computer 112 can utilize the information obtained from the yoke strain sensor 38 in combination with the information obtained from the accelerometer 105 for diagnosing gear abnormality conditions and spring pack abnormality conditions. Both are determined by demodulating the accelerometer signal at a frequency generally corresponding to the worm gear mesh frequency. The modulated worm gear mesh frequency signal contains information about all gear abnormalities and spring pack functions. For example, an offset worm gear would result in a modulation of the worm gear mesh frequency at the rate at which the worm gear rotates. Correspondingly, the beginning of spring pack movement corresponds to a discontinuity in worm gear mesh frequency in a manner so that the force measured by the yoke strain sensor 38 at the corresponding time indicates the degree of spring pack precompression.

A computer program adapted to permit the computer 112 to perform the various comparison and indicating functions necessary for evaluating the condition and performance of the valve 12 and valve operator 14 combination is well within the skill of a person skilled in the programming arts and, therefore, need not be presented herein. However, FIGS. 9a through 9k provide a schematic flow diagram of a preferred embodiment of the principal features of such a program. A detailed discussion of the flow diagrams shown in FIGS. 9a through 9k is not believed to be necessary for a complete understanding of the present invention and, therefore, will not be presented. However, specific examples are set fort below.

The computer 112 receives and stores digital samples representative of valve stem forces for predetermined time periods to establish a valve stem force digital record. The computer then compares the valve stem force digital record with a previously stored valve stem force reference record of the forces expected to be experienced by the valve stem during normal operation. The computer then provides an indication of deviations resulting from the comparison and, if the deviations fall outside of predetermined limits, the computer alerts the operator. Similarly, the computer compares the valve stem force digital record with corresponding, previously stored valve stem force digital records for indicating changes and trends over time with respect to the forces on the valve stem. Again, if the changes or trends fall outside of predetermined limits, the computer alerts the operator.

As previously described, the computer 112 also displays information pertaining to valve stem strain (if applicable), motor current, valve stem motion, spring pack motion and the state of the torque and limit switches. Similarly, each of the various informations is compared by the computer to reference information relating to normal valve functioning and to previously stored information to provide trends. In addition, the information from the yoke strain sensor 38 is compared to the information from each of the other sensors and the torque and limit switch indicator information for diagnosis of specific problems, as discussed in detail above. Each of the various displays and comparisons is made on a continuing or periodic basis during valve operation. In this manner, the computer 112 keeps the operator continuously informed concerning the structural condition and performance of the entire valve and valve operator combination, as well as providing the operator with diagnostic information concerning particular problems occurring at any given time or problems which may occur at some time in the future based upon trends.

FIG. 10 illustrates an alternate embodiment of the present invention. In the embodiment shown in FIG. 10, which is essentially the same as the above-described embodiments, a second strain sensor means 200 is secured to an outer surface of the valve operator 14. Preferably, the second strain sensor means or operator strain sensor 200 is structurally the same as the yoke strain sensor 38, which has previously been described in detail and is illustrated in FIGS. 4a through 4c. However, some other type of strain sensor means could alternatively be employed. As with the yoke strain sensor 38, the operator strain sensor 200 is secured to the outer surface of the valve operator 14 utilizing mounting means, in the present embodiment comprising a pair of mounting posts 202 which are substantially the same as mounting posts 62 and 64 (see FIG. 6) employed for mounting the yoke strain sensor 38 on the valve yoke 16. The operator strain sensor 200 is not employed for the measurement of compressive strains in the valve operator 14. Accordingly, it is not necessary to position the mounting posts 62 in a precisely spaced relationship to create a predetermined initial tension on the operator strain sensor 200. Instead, the mounting posts 202 are secured to the valve operator 14 so that the operator strain sensor 200 experiences no initial tension or compression although an initial tension could be applied, if desired. The mounting posts 202 may be secured to the valve operator 14 utilizing soldering, brazing, welding, epoxy, or some other kind of adhesive, or in any other manner known in the art. The operator strain sensor 200 may be secured to the mounting posts 202 utilizing a plurality of screws (not shown), wax (not shown) or any other suitable permanent or temporary securing means. Suitable electrical leads 204 extend outwardly from the operator strain sensor 200 to a display means (not shown in FIG. 10). The display means may be any of the various types of display means described above.

The operator strain sensor 200 is provided for sensing tensile forces applied to the valve operator 14. Such tensile forces are generally experienced by the valve operator 14 upon seating of the valve gate 18 against the valve seat 20 (FIG. 1) during valve closing and, during valve opening, when artificially restricting the opening movement of the valve stem 24 at the top of the valve operator to verify open torque switch setting. In a valve going through a normal closing stroke, the tensile forces experienced by the valve yoke 16 and the yoke strain sensor 38 are identical to the tensile strain forces experienced by the operator 14 housing and the operator strain sensor 200. Therefore, the operator strain sensor 200 may be calibrated in the same manner as above described with respect to the yoke strain sensor 38. During a restricted opening, restricted at the top of the valve operator as described above, the calibrated signal from the operator strain sensor 200 can be used in combination with the signal indicating when the open torque switch opens to determine whether the open torque switch is opening at the proper force level. With a valve undergoing a normal opening stroke, although compressive forces are experienced by the valve yoke 16, no tensile or compressive forces are experienced by the operator housing or the operator strain sensor 200. Thus, the signal generated by the operator strain sensor 200 indicates a clear transition point as the stem transitions from compression to tension. The corresponding point on the yoke strain sensor output signal is thus a known zero force point on the valve stem. It will be recognized by those skilled in the art that the signals generated by the operator strain sensor 200 could alternatively be employed in conjunction with other diagnostic signals of the type described above, or of any other type, for the purpose of providing information concerning the functioning of the valve and valve operator.

From the foregoing description, it can be seen that the present invention comprises a system for evaluating the condition and performance of a valve and valve operator combination utilizing a strain sensor means secured to the valve yoke for sensing and indicating valve stem forces. It will be appreciated by those skilled in the art that changes could be made to the embodiment described above without departing from the broad inventive concept thereof. It is understood, therefore, that this invention is not limited to the particular embodiment disclosed, but it is intended to cover all modifications which are within the scope and spirit of the invention as defined by the appended claims.

I claim:

1. A device for measuring and indicating the forces on a valve stem of a valve having an operator within an operator housing, over at least a portion of the valve stroke, the device comprising:
    first strain sensor means secured to a valve yoke and substantially parallel to the valve stem for sensing strains experienced by the valve yoke which are proportional to the forces on the valve yoke and are equal and opposite to the forces on the valve stem, the first strain sensor means for generating first electrical signals proportional to the forces on the valve stem;
    second strain sensor means secured to the valve operator housing for sensing strains experienced by the operator housing, the second strain sensor means for generating second electrical signals proportional to forces on the operator housing; and
    display means electrically connected to the first and second strain sensor means for receiving the first and second electrical signals and for indicating the forces on the valve stem and the operator housing.

2. The device as recited in claim 1 wherein the first and second strain sensor means are each comprised of:
    a tensile strain member; and
    a strain gage bridge circuit connected to the display means, and including at least one strain gage secured to the tensile strain member.

3. The device as recited in claim 2 wherein the first and second strain sensor means each further comprises four strain gages secured to the tensile strain member, two of the strain gages being longitudinally oriented with respect to the member to experience longitudinal strain and two of the strain gages being transversely oriented with respect to the member to experience Poisson strain, the four strain gages forming the strain gage bridge circuit.

4. The device as recited in claim 3 wherein each tensile strain member is a generally flat elongated beam having first and second opposite elongated surfaces, two of the strain gages being secured to the first surface and two of the strain gages being secured to the second surface.

5. The device as recited in claim 4 wherein one longitudinally oriented strain gage and one transversely oriented strain gage is secured to each of said first and second surfaces of each beam.

6. A system for evaluating the condition and performance of a valve and valve operator combination, including a valve, a valve operator, a valve stem extending between the valve operator and the valve, and a valve yoke surrounding the valve stem, the system comprising:
    first strain sensor means secured to the valve yoke and substantially parallel to the valve stem for sensing strains experienced by the valve yoke which are proportional to the forces on the valve yoke and are equal and opposite to the forces on the valve stem, the first strain sensor means also for generating electrical signals proportional to the forces on the valve stem;
    second strain sensor means secured to the valve operator for sensing strains experienced by the valve operator and for generating electrical signals proportional to the forces on the valve operator;
    valve stem motion sensor means for detecting motion and direction of movement of the valve stem and for generating electrical signals proportional to the velocity of valve stem movement, the signals having a polarity indicative of the direction of valve stem movement; and
    display means electrically connected to the first and second strain sensor means and to the valve stem motion sensor means for receiving the generated electrical signals and for indicating the forces on the valve stem, and on the valve operator and the corresponding valve stem velocity to permit identification of a disruption in normal valve and/or valve operator functioning.

7. A system for evaluating the condition and performance of a valve and valve operator combination, including a valve, a valve operator containing a motor, gearing, a spring pack and torque and limit switches, a valve stem extending between the valve operator and the valve, and a valve yoke surrounding the valve stem, the system comprising:
    first strain sensor means secured to the valve yoke and substantially parallel to the valve stem for sensing strains experienced by the valve yoke which are proportional to the forces on the valve yoke and are equal and opposite to the forces on the valve stem, the first strain sensor means also for generating electrical signals proportional to the forces on the valve stem;
    second strain sensor means secured to the valve operator for sensing strains experienced by the valve operator and for generating electrical signals proportional to forces on the valve operator;
    spring pack motion sensor means for detecting motion and direction of movement of the spring pack and for generating electrical signals proportional to the velocity of spring pack movement, the signals having a polarity indicative of the direction of spring pack movement; and
    display means electrically connected to the first and second strain sensor means and to the spring pack motion sensor means for receiving the generated electrical signals and for indicating the forces on the valve stem, and on the valve operator and the corresponding spring pack velocity to permit identification of a disruption in normal valve and/or valve operator functioning.

8. A system for evaluating the condition and performance of a valve and valve operator combination, including a valve, a valve operator containing a motor, gearing, a spring pack and torque and limit switches, a valve stem extending between the valve operator and the valve, and a valve yoke surrounding the valve stem, the system comprising:

first strain sensor means secured to the valve yoke and substantially parallel to the valve stem for ensing strains experienced by the valve yoke which are proportional to the forces on the valve yoke and are equal and opposite to the forces on the valve stem, the first strain sensor means also for generating electrical signals proportional to the forces on the valve stem;

second strain sensor means secured to the valve operator for sensing strains experienced by the valve operator and for generating electrical signals proportional to forces on the valve operator;

motor current sensor means for detecting the flow of current through the motor and for generating electrical signals proportional to the motor current; and display means electrically connected to the first and second strain sensor means and to the motor current sensor means for receiving the generated electrical signals and for indicating the forces on the valve stem, and on the valve operator and the corresponding motor current to permit identification of a disruption in normal valve and/or valve operator functioning.

9. A system for evaluating the condition and performance of a valve and valve operator combination, including a valve, a valve operator containing a motor, gearing, a spring pack and torque and limit switches, a valve stem extending between the valve operator and the valve, and a valve yoke surrounding the valve stem, the system comprising:

first strain sensor means secured to the valve yoke and substantially parallel to the valve stem for sensing strains experienced by the valve yoke which are proportional to the forces on the valve yoke and are equal and opposite to the forces on the valve stem, the first strain sensor means also for generating electrical signals proportional to the forces on the valve stem;

second strain sensor means secured to the valve operator for sensing strains experienced by the valve operator and for generating electrical signals proportional to forces on the valve operator;

torque and limit switch indicating means for detecting the state of the torque and limit switches and for generating electrical signals; and display means electrically connected to the first and second strain sensor means and to the torque and limit switch indicating means for receiving the generated electrical signals and for indicating the forces on the valve stem, the forces on the valve operator and the opening and closing of the torque and limit switches to permit identification of a disruption in normal valve and/or valve operator functioning.

10. A device for measuring and indicating the forces on a valve stem of a valve having an operator within an operator housing, over at least a portion of the valve stroke, the device comprising:

first strain sensor means secured to a valve yoke and substantially parallel to the valve stem for sensing strains experienced by the valve yoke, which are proportional to the forces on the valve yoke and are equal and opposite to the forces on the valve stem, the first strain sensor means for generating first electrical signals proportional to the forces on the valve stem;

vibration measuring means on a surface of the valve operator for sensing vibrations in the valve and/or valve operator and for generating second electrical signals proportional thereto; and display means electrically connected to the first strain sensor means and to the vibration measuring means for receiving the first and second electrical signals and for indicating the forces on the valve stem and the vibrations occurring in the valve and/or valve operator.

11. A device for measuring and indicating the forces on a valve stem of a valve having an operator within an operator housing, over at least a portion of the valve stroke, the device comprising:

first strain sensor means secured to a valve yoke and substantially parallel to the valve stem for sensing strains experienced by the valve yoke which are proportional to the forces on the valve yoke and are equal and opposite to the forces on the valve stem, the first strain sensor means for generating first electrical signals proportional to the forces n the valve stem;

second strain sensor means secured to the valve operator housing for sensing strains experienced by the operator housing, the second strain sensor means for generating second electrical signals proportional to forces on the operator housing;

vibration measuring means on a surface of the valve operator for sensing vibrations in the valve and/or valve operator and for generating third electrical signals proportional thereto; and display means electrically connected to the first and second strain sensor means and to the vibration measuring means for receiving the first, second and third electrical signals and for indicating the forces on the valve stem and on the operator housing and vibrations occurring in the valve and/or valve operator.

12. A system for evaluating the condition and performance of a valve and valve operator combination, including a valve, a valve operator containing a motor, gearing, a spring pack and torque and limit switches, a valve stem extending between the valve operator and the valve, and a valve yoke surrounding the valve stem, the system comprising:

first strain sensor means secured to the valve yoke and substantially parallel to the valve stem for sensing strains experienced by the valve yoke which are proportional to the forces on the valve yoke and are equal and opposite to the forces on the valve stem, the first strain sensor means for generating first electrical signals proportional to the forces on the valve stem;

vibration measuring means on a surface of the valve operator for sensing vibrations in the valve and/or valve operator and for generating second electrical signals proportional thereto;

valve stem motion sensor means for detecting motion and direction of movement of the valve stem and for generating electrical signals proportional to the velocity of valve stem movement, the signals having a polarity indicative of the direction of valve stem movement; and display means electrically connected to the first strain sensor means, the vibration measuring means and to the valve stem motion sensor means for receiving the first and second electrical signals and the valve stem movement signals and for indicating the forces on the valve stem, the vibrations occurring in the valve and/or valve operator and the corresponding valve stem velocity to permit identification of a disruption in normal valve and/or valve operator functioning.

13. A system for evaluating the condition and performance of a valve and valve operator combination, including a valve, a valve operator containing a motor, gearing, a spring pack and torque and limit switches, a valve stem extending between the valve operator and the valve, and a valve yoke surrounding the valve stem, the system, comprising:

first strain sensor means secured to the valve yoke and substantially parallel to the valve stem for sensing strains experienced by the valve yoke which are proportional to the forces on the valve yoke and are equal and opposite to the forces on the valve stem, the first strain sensor means for generating first electrical signals proportional to the forces on the valve stem;

vibration measuring means on a surface of the valve operator for sensing vibrations in the valve and/or valve operator and for generating second electrical signals proportional thereto;

spring pack motion sensor means for detecting motion and direction of movement of the spring pack and for generating electrical signals proportional to the velocity of spring pack movement, the signals having a polarity indicative of the direction of spring pack movement; and display means electrically connected to the first strain sensor means and to the vibration measuring means for receiving the first and second electrical signals and connected to the spring pack motion sensor means for receiving the generated electrical signals, the display means for indicating the forces on the valve stem and the vibrations occurring in the valve and/or valve operator and the corresponding spring pack velocity to permit identification of a disruption in normal valve and/or valve operator function.

14. A system for evaluating the condition and performance of a valve and valve operator combination, including a valve, a valve operator containing a motor, gearing, a spring pack and torque and limit switches, a valve stem extending between the valve operator and the valve, and a valve yoke surrounding the valve stem, the system comprising:

first strain sensor means secured to the valve yoke and substantially parallel to the valve stem for sensing strains experienced by the valve yoke which are proportional to the forces on the valve yoke and are equal and opposite to the forces on the valve stem, the first strain sensor means for generating first electrical signals proportional to the forces on the valve stem;

vibration measuring means on a surface of the valve operator for sensing vibrations in the valve and/or valve operator and for generating second electrical signals proportional thereto;

motor current sensor means for detecting the flow of current through the motor and for generating electrical signals proportional to the motor current; and display means electrically connected to the first strain sensor means, to the vibration measuring means and to the motor current sensor means for receiving the first and second electrical signals and the signals generated by the motor current sensor means and for indicating the forces on the valve stem, the vibrations occurring in the valve and/or valve operator and the corresponding motor current to permit identification of a disruption in normal valve and/or valve operator functioning.

15. A system for evaluating the condition and performance of a valve and valve operator combination, including a valve, a valve operator containing a motor, gearing, a spring pack and torque and limit switches, a valve stem extending between the valve operator and the valve, and a valve yoke surrounding the valve stem, the system comprising:

first strain sensor means secured to the valve yoke and substantially parallel to the valve stem for sensing strains experienced by the valve yoke which are proportional to the forces on the valve yoke and are equal and opposite to the forces on the valve stem, the first strain sensor means for generating first electrical signals proportional to the forces on the valve stem;

vibration measuring means on a surface of the valve operator for sensing vibrations in the valve and/or valve operator and for generating second electrical signals proportional thereto;

torque and limit switch indicating means for detecting the state of the torque and limit switches and for generating electrical signals; and display means electrically connected to the first strain sensor means, to the vibration measuring means and to the torque and limit switch indicating means for receiving the first and second electrical signals and the electrical signals generated by the torque and limit switch indicating means and for indicating the forces on the valve stem, the vibrations occurring in the valve and/or the valve operator and the corresponding opening and closing of the torque and limit switches to permit identification of a disruption in normal valve and/or valve operator functioning.

* * * * *